United States Patent
Sun et al.

(10) Patent No.: US 12,491,788 B2
(45) Date of Patent: Dec. 9, 2025

(54) CHARGING STATION CAPABLE OF REALIZING MUTUAL CAPACITY AID

(71) Applicants: JIANGSU ELECTRIC POWER RESEARCH INSTITUTE CO., LTD., Jiangsu (CN); STATE GRID JIANGSU ELECTRIC POWER CO., LTD. RESEARCH INSTITUTE, Jiangsu (CN)

(72) Inventors: Tiankui Sun, Jiangsu (CN); Yubo Yuan, Jiangsu (CN); Mingming Shi, Jiangsu (CN); Xin Fang, Jiangsu (CN); Jinggang Yang, Jiangsu (CN); Shuyi Zhuang, Jiangsu (CN); Xiaodong Yuan, Jiangsu (CN); Chenyu Zhang, Jiangsu (CN); Lei Gao, Jiangsu (CN); Peng Li, Jiangsu (CN); Yaojia Ma, Jiangsu (CN); Shu Chen, Jiangsu (CN); Jing Chen, Jiangsu (CN); Qun Li, Jiangsu (CN); Jian Liu, Jiangsu (CN)

(73) Assignees: JIANGSU ELECTRIC POWER RESEARCH INSTITUTE CO., LTD. (CN); STATE GRID JIANGSU ELECTRIC POWER CO., LTD. RESEARCH INSTITUTE (CN)

( * ) Notice: Subject to any disclaimer, the term of this patent is extended or adjusted under 35 U.S.C. 154(b) by 207 days.

(21) Appl. No.: 18/001,526

(22) PCT Filed: Jun. 4, 2021

(86) PCT No.: PCT/CN2021/098275
§ 371 (c)(1),
(2) Date: Dec. 12, 2022

(87) PCT Pub. No.: WO2022/241858
PCT Pub. Date: Nov. 24, 2022

(65) Prior Publication Data
US 2024/0067036 A1    Feb. 29, 2024

(30) Foreign Application Priority Data

May 18, 2021 (CN) .......................... 202110539213.1

(51) Int. Cl.
*B60L 53/67* (2019.01)
*B60L 53/30* (2019.01)

(52) U.S. Cl.
CPC ............... *B60L 53/67* (2019.02); *B60L 53/30* (2019.02)

(58) Field of Classification Search
CPC .................................. B60L 53/30; B60L 53/67
(Continued)

(56) References Cited

U.S. PATENT DOCUMENTS

| 2009/0040029 A1* | 2/2009 | Bridges | B60L 55/00 340/12.51 |
| 2010/0017249 A1* | 1/2010 | Fincham | B60L 55/00 320/108 |

(Continued)

*Primary Examiner* — Alexis B Pacheco

(57) ABSTRACT

Disclosed is a charging station capable of realizing mutual capacity aid, which comprises a plurality of charging units, a power bus and a mutual capacity aid bus. Each charging unit is powered by the power bus, and each charging unit provides mutual aid capacity for another charging unit through the mutual capacity aid bus or receives mutual aid capacity from other charging units through the mutual capacity aid bus. The charging station can realize rapid charging of electric vehicles, and can also realize mutual capacity aid.

3 Claims, 2 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2010/0094496 A1* | 4/2010 | Hershkovitz | B60L 50/66 |
| | | | 701/22 |
| 2014/0089016 A1* | 3/2014 | Smullin | G06Q 10/02 |
| | | | 705/5 |
| 2015/0032516 A1* | 1/2015 | Deshpande | G06Q 50/06 |
| | | | 705/13 |

* cited by examiner

CHARGING STATION CAPABLE OF REALIZING MUTUAL CAPACITY AID

FIELD OF THE INVENTION

The invention belongs to the technical field of electric vehicle charging, and particularly relates to a charging station which is used for fast charging of electric vehicles and capable of realizing mutual capacity aid.

BACKGROUND OF THE INVENTION

At present, the number of electric vehicles in the market is still small, which leads, to the low utilization rate of charging capacity in electric vehicle charging stations. An existing integrated charging pile scheme with double guns sharing capacity can only realize mutual capacity aid between two charging guns on, a single charging pile, and only a single charging gun can be used in the case of mutual aid. A split charging station scheme can realize flexible capacity allocation among all charging piles in a charging station, but a matrix relay adopted is expensive, bulky and not reliable enough, and a short circuit occurs often due to relay adhesion.

SUMMARY OF THE INVENTION

Purpose of the Invention: In order to solve the problem of low utilization rate of charging capacity in a charging station, the invention provides a charging station which is used for fast charging of electric vehicles and capable of realizing mutual capacity aid.

Technical Scheme

A charging station capable of realizing mutual capacity aid comprises a plurality of charging units, a power bus and a mutual capacity aid bus, wherein each charging unit is powered by the power bus, and each charging unit provides mutual aid capacity for another charging unit through the mutual capacity aid bus or receives mutual aid capacity from other charging units through the mutual capacity aid bus;

each charging unit comprises a basic charging module, a mutual aid charging module, a front-end mutual aid switch, a back-end mutual aid switch, a charging bus, a charging switch and a charging gun; an input terminal of the basic charging module is connected to the power bus, and an output terminal is connected to the corresponding charging bus; an input terminal of the mutual aid charging module is connected to the power bus, and an output terminal is connected to a movable contact of the corresponding front-end mutual aid switch; a normally closed static contact of the front-end mutual aid switch is connected to the corresponding charging bus, and a normally open static contact is connected to the mutual capacity aid bus; a movable contact of the back-end mutual aid switch is connected to the mutual capacity aid bus, and a static contact is connected to the corresponding charging bus; a movable contact of the charging switch is connected to the corresponding charging bus, and a static contact is connected to the corresponding charging gun;

a charging unit connected to an electric vehicle is recorded as a target charging unit; when required power of the target charging unit does not exceed its own power or when the required power of the target charging unit exceeds its own power and other charging units have no capacity for mutual aid, the target charging unit is in an independent working mode; in this working mode, the movable contact of the front-end mutual aid switch of the target charging unit is controlled to be connected to the normally closed static contact, the back-end mutual aid switch is in an open state, the charging bus in the target charging unit provides maximum charging capacity for the power receiving electric vehicle through the charging gun, and the maximum charging capacity is the sum of the capacity of the corresponding basic charging module and the capacity of the corresponding mutual aid charging module in the target charging unit;

when the required power of the target charging unit exceeds its own power and other charging units have the capacity for mutual aid, the target charging unit is in a mutual capacity aid power receiving working mode; in this working mode, the movable contact of the front-end mutual aid switch of the target charging unit is controlled to be connected to the normally, closed static contact, and the back-end mutual aid switch is in a closed state; the maximum charging capacity provided by the charging gun of the target charging unit for the power receiving electric vehicle is the sum of the capacities of the mutual aid charging modules of other charging units connected to the mutual capacity aid bus, the capacity of the corresponding basic charging module in the target charging unit and the capacity of the corresponding mutual, aid charging module in the target charging unit;

when the required power of a non-target charging unit in the charging station exceeds its own power and the target charging unit has the capacity for mutual aid, the target charging unit is in a mutual capacity aid power supply working mode; and in this working mode, the movable contact of the front-end mutual aid switch of the target charging unit is controlled to be connected to the open static contact, the back-end mutual aid switch is in an open state, and the mutual aid charging module of the target charging unit is connected to the mutual capacity aid bus.

Further, among the plurality of charging units connected to the mutual capacity aid bus, only one charging unit is in the mutual capacity aid power receiving working mode, and one or more charging units are in the mutual capacity aid power supply mode.

Further, the front-end mutual aid switch is a Form Z relay.
Further, the back-end mutual aid switch is a Form H relay.

Beneficial Effects

Compared with the prior art, the invention has the following beneficial effects:
(1) compared with an integrated charging pile, the invention improves the utilization rate of a power module in an electric charging station; and
(2) compared with a split electric vehicle charging pile, the invention has the advantages of small occupied area, low cost and high reliability.

DETAILED DESCRIPTION OF THE INVENTION

The technical, scheme of the invention will be further explained with reference to the drawings and embodiments.

A charging station capable of realizing mutual capacity aid according to the invention comprises N charging units, a power bus 1001 and a mutual capacity aid bus 1002. Each charging unit mainly comprises a basic charging module (1211, 2211 . . . K211 . . . N211 in FIG. 1), a mutual aid charging module (1221, 2221 . . . K221 . . . N221 in FIG. 1), a front-end mutual aid switch (1111, 2111 . . . K111 . . . N1111 in FIG. 1), a back-end mutual aid switch (1121, 2121 . . . K121 . . . N121 in FIG. 1), a charging buses (1401, 2401 . . . K401 . . . N401 in FIG. 1), a charging switch (1122, 2122 . . . K122 . . . N122 in FIG. 1) and a charging gun (1311, 2311 . . . K311 . . . N311 in FIG. 1).

An input terminal of the basic charging module (1211, 2211 . . . K211 . . . N1211 in FIG. 1) is connected to the power bus 1001, and an output terminals is connected to the corresponding charging bus (1401, 2401 . . . K401 . . . N401 in FIG. 1).

An input terminal of the mutual aid charging module (1221, 2221 . . . K221 . . . N221 in FIG. 1) is connected to the power bus 1001, and an output terminal is connected to a movable contact of the corresponding front-end mutual aid switch (1111, 2111 . . . K111 . . . N111 in FIG. 1).

A normally closed static contact of the front-end mutual aid switch (1111, 2111 . . . K111 . . . N111 in FIG. 1) is connected to the corresponding charging bus (1401, 2401 . . . K401 . . . N1401 in FIG. 1), and a normally open static contact is connected to the mutual capacity aid bus 1002. The front-end mutual aid switch is preferably a Form Z relay.

A movable contact of the back-end mutual aid switch (1121, 2121 . . . K121. . . N121 in FIG. 1) is connected to the mutual capacity aid bus 1002, and a static contact, is connected to the corresponding charging bus (1401, 2401 . . . K401 . . . N401 in FIG. 1). The back-end mutual aid switch is preferably a Form H relay.

A movable contact of the charging switch (1122, 2122 . . . K122 . . . N122 in FIG. 1) is connected to the corresponding charging bus (1401, 2401 . . . K401 . . . N401 in FIG. 1), and a static contact is connected to the corresponding charging gun (1311, 2311 . . . K311 . . . N311 in FIG. 1).

Figure 1:
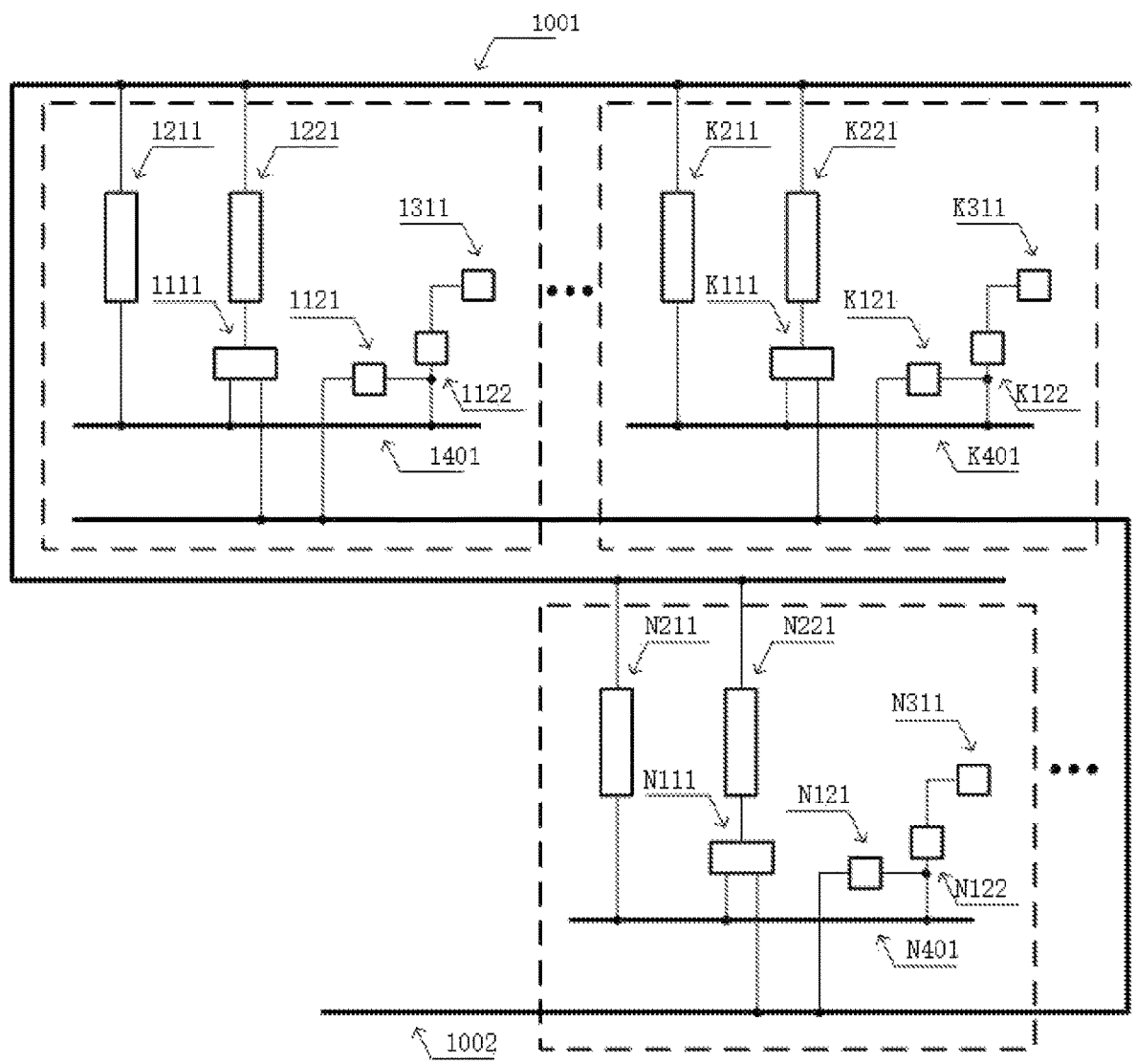
FIG. 1 is a diagram of an electrical topology of the invention.

See FIG. 1 for the specific topology. Based on this topology, the following working modes may be adopted.

(1) Independent working mode: When the required power of the target charging unit does not exceed its own power, the target charging unit is in the independent working mode; or when the required power of the target charging unit exceeds its own power and other charging units in the charging station have no capacity for mutual aid, the target charging unit is in the independent working mode.

In the independent working mode, the movable contact of the front-end mutual aid switch of the target charging unit is connected to the normally closed static contact, and the back-end mutual aid switch is in an open state, so that the target charging unit can provide maximum charging capacity for the power receiving electric vehicle through the charging gun, which is the sum of the capacity of the basic charging module and the capacity of the mutual aid charging module in the target charging unit.

(2) Mutual capacity aid power receiving working mode: When the required power of the target charging unit exceeds its own power and other charging units in the charging station have idle mutual aid charging modules which can provide mutual aid capacity, the target charging unit is in the mutual capacity aid power receiving working mode.

In the mutual capacity aid power receiving working mode, the movable contact of the front-end mutual aid switch of the target charging unit is connected to the normally closed static contact, and the back-end mutual aid switch is in a closed state. The target charging unit can provide the maximum charging capacity for the power receiving electric vehicle through the charging gun, and the maximum charging capacity at this point is the sum of the capacity of the corresponding basic charging module and the capacity of the corresponding mutual aid charging module in the target charging unit and the capacities of the mutual aid charging modules of other charging units connected to the mutual capacity aid bus.

(3) Mutual capacity aid power supply working mode:
When the required power of a charging unit (non-target charging unit) in the charging station exceeds its own power and the target charging unit has an idle mutual aid charging module which can provide mutual aid capacity, the target charging unit is in the mutual capacity aid power supply working mode.

In the mutual capacity aid power supply working mode, the movable contact of the front-end mutual aid switch of the target charging unit, is connected to the open static contact, the back-end mutual aid switch is in an open state, and the mutual aid charging module in the target charging unit is connected to the mutual capacity aid bus.

Among a plurality of charging units connected to a single mutual capacity aid bus in one charging station, only one charging unit can be in the mutual capacity aid power receiving working mode, but multiple charging units can be in the mutual capacity aid power supply mode.

The technical scheme of the invention will be further explained by taking a 4-pile charging station capable of realizing mutual capacity aid for electric vehicles as an example.

Figure 2:
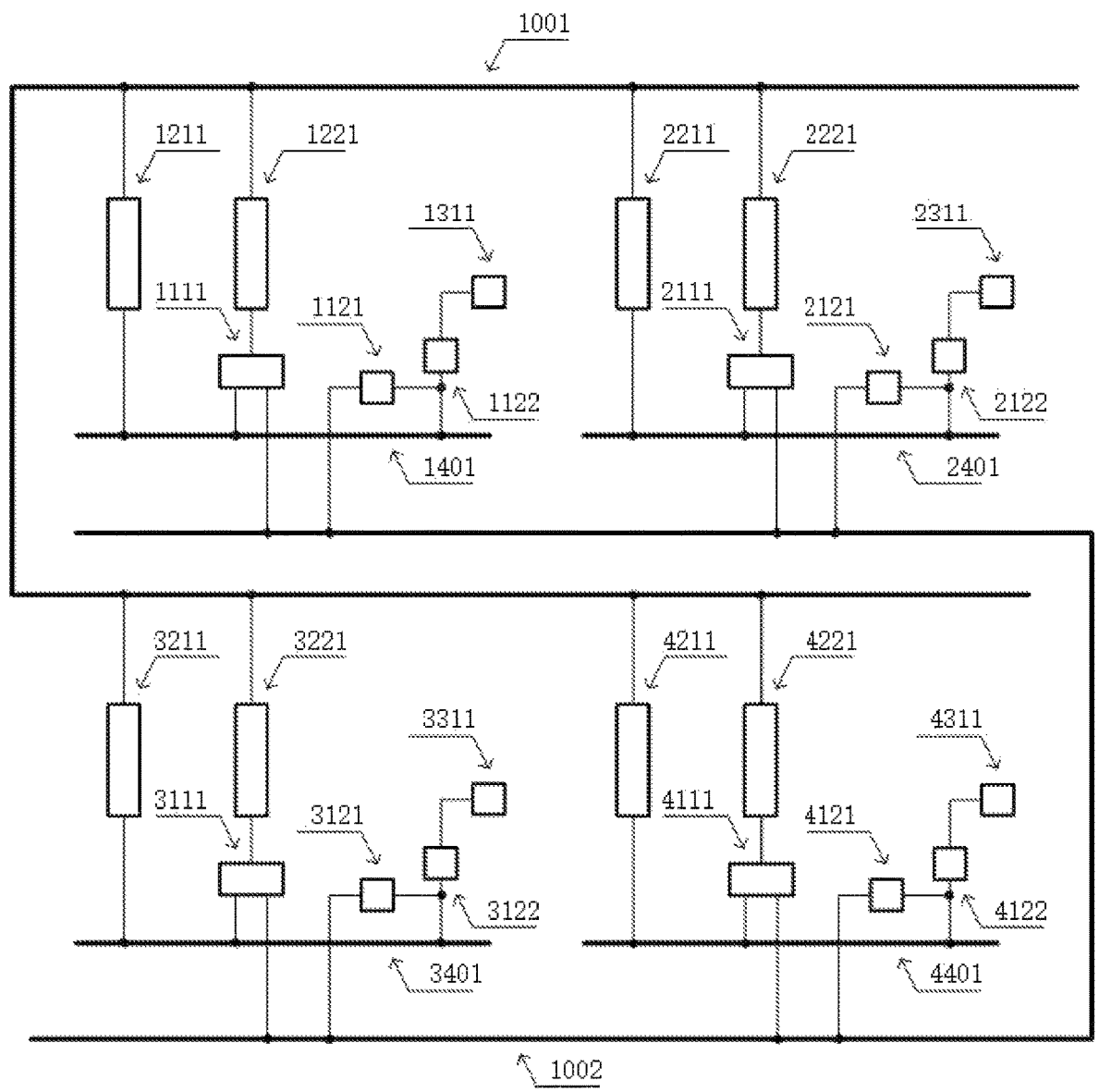
FIG. 2 is a diagram of a 4-pile charging station system capable of realizing mutual capacity aid in an embodiment.

Referring to FIG. 2, the charging station capable of realizing mutual capacity aid for electric vehicles comprises four charging units directly connected to a mutual capacity, aid bus 1002, the four charging units are all powered by, a power bus 1001, and the four charging units have the same configuration.

Now take the first charging unit, as an example. The charging unit comprises a basic charging module 1211, a mutual capacity aid charging module 1221, a front-end mutual aid switch 1111, a back-end mutual aid switch 1121, a charging bus 1401, a charging switch 1122 and a charging gun 1311. According to the connection relationship of the components in FIG. 1, the components in the first charging unit are connected.

The system is powered by DC 750 V, and the power bus 1001 is connected to a DC 750 V distribution network. The basic charging module 1211 is an isolation DC/DC module with a rated capacity of 7 kW, a rated input voltage of DC 750 V and an output voltage of DC 200 V to DC 950 V. The mutual capacity aid charging module 1221 is an isolation DC/DC module with a rated capacity of 20 kW, a rated input voltage of DC 750 V and an output voltage of DC 200 V to DC 950 V. The front-end mutual aid switch 1111 is a contactor with a rated, current of 63 A and, a rated voltage of 10001. The back-end, mutual capacity aid switch 1121 is a contactor with a rated current of 160 A.

In a certain application scenario, the required power of the first charging unit connected to, the electric vehicle is 80 kW, the required power of the second charging unit connected to the electric vehicle is 25 kW, the required power of the third charging unit connected to the electric vehicle, is 5 kW, and the fourth charging unit is not connected to the electric vehicle. The required power of the first charging unit exceeds its own power limit, the second charging unit just meets the required power, and the third charging unit and the fourth charging unit each have 20 kW mutual capacity aid charging modules. The first charging unit needs to work in the mutual capacity aid power receiving working mode, the second charging unit needs to work in the independent working mode, and the third charging unit and the fourth charging unit need to work in the mutual capacity aid power supply mode.

Therefore, the movable contact of the front-end mutual aid switch 1111 of the first charging unit is connected to the normally closed static contact, and the back-end mutual aid switch 1121 works in a closed state; and the first charging unit provides the maximum charging capacity for the power receiving electric vehicle through the charging gun, and the maximum charging capacity is the sum of the capacities of the basic charging module 1211, the mutual aid charging module 1221, the mutual aid charging module 3221 and the mutual aid charging module 4221.

The movable contact of the front-end mutual aid switch 2111 of the second charging unit is connected to the normally closed static contact, and the back-end mutual aid switch 2121 works in an open state. The second charging unit provides the maximum charging capacity for the power receiving electric vehicle through the charging gun, and the maximum charging capacity is the sum of the capacities of the basic charging module 2211 and the mutual aid charging module 2221.

The movable contact of the front-end mutual aid switch 3111 of the third charging unit is connected to the open static contact, and the back-end mutual aid switch 3121 works in an open state. The mutual aid charging module 3221 is connected to the mutual capacity aid bus 1002 to provide mutual aid capacity for the first charging unit.

The movable contact of the front-end mutual aid switch 4111 of the fourth charging unit is connected to the open static contact, and the back-end mutual aid switch 4121 works in an open state. The mutual aid charging module 4221 is connected to the mutual capacity aid bus 1002 to provide mutual aid capacity for the first charging unit.

The invention claimed is:

1. A charging station capable of realizing mutual capacity aid, comprising a plurality of charging units, a power bus (1001) and a mutual capacity aid bus (1002), wherein each said charging unit is powered by the power bus (1001), and each said charging unit provides mutual aid capacity for another charging unit through the mutual capacity aid bus (1002) or receives mutual aid capacity from other charging units through the mutual capacity aid bus (1002);

each said charging unit comprises a basic charging module, a mutual aid charging module, a front-end mutual aid switch, a back-end mutual aid switch, a charging bus, a charging switch and a charging gun; an input terminal of the basic charging module is connected to the power bus (1001), and an output terminal is connected to the corresponding charging bus; an input terminal of the mutual aid charging module is connected to the power bus (1001), and an output terminal is connected to a movable contact of the corresponding front-end mutual aid switch; a normally closed static contact of the front-end mutual aid switch is connected to the corresponding charging bus, and a normally open static contact is connected to the mutual capacity aid bus (1002); a movable contact of the back-end mutual aid switch is connected to the mutual capacity aid bus (1002), and a static contact is connected to the corresponding charging bus; a movable contact of the charging switch is connected to the corresponding charging bus, and a static contact is connected to the corresponding charging gun;

a charging unit connected to an electric vehicle is recorded as a target charging unit; when required power of the target charging unit does not exceed its own power or when the required power of the target charging unit exceeds its own power and other charging units have no capacity for mutual aid, the target charging unit is in an independent working mode; in this working mode, the movable contact of the front-end mutual aid switch of the target charging unit is controlled to be connected to the normally closed static contact, the back-end mutual aid switch is in an open state, the charging bus in the target charging unit provides maximum charging capacity for the power receiving electric vehicle through the charging gun, and the maximum charging capacity is the sum of the capacity of the corresponding basic charging module and the capacity of the corresponding mutual aid charging module in the target charging unit;

when the required power of the target charging unit exceeds its own power and other charging units have the capacity for mutual aid, the target charging unit is in a mutual capacity aid power receiving working mode; in this working mode, the movable contact of the front-end mutual aid switch of the target charging unit is controlled to be connected to the normally closed static contact, and the back-end mutual aid switch is in a closed state; the maximum charging capacity provided by the charging gun of the target charging unit to the power receiving electric vehicle is the sum of the capacities of the mutual aid charging modules of other charging units connected to the mutual capacity aid bus (1002), the capacity of the corresponding basic charging module in the target charging unit and the capacity of the corresponding mutual aid charging module in the target charging unit;

when the required power of a non-target charging unit in the charging station exceeds its own power and the target charging unit has the capacity for mutual aid, the target charging unit is in a mutual capacity aid power supply working mode; and in the working mode, the movable contact of the front-end mutual aid switch of the target charging unit is controlled to be connected to the open static contact, the back-end mutual aid switch is in an open state, and the mutual aid charging module of the target charging unit is connected to the mutual capacity aid bus (1002);

among the plurality of charging units connected to the mutual capacity aid bus (1002), only one said charging unit is in the mutual capacity aid power receiving working mode, and one or more said charging units are in the mutual capacity aid power supply mode.

2. The charging station capable of realizing mutual capacity aid according to claim 1, wherein, the front-end mutual aid switch is a Form Z relay.

3. The charging station capable of realizing mutual capacity aid according claim 1, wherein, the back-end mutual aid switch is a Form H relay.

* * * * *